United States Patent [19]

Zickler et al.

[11] Patent Number: 5,308,892
[45] Date of Patent: May 3, 1994

[54] PROCESS FOR THE PREPARATION OF POLYESTER-MASTERBATCH CONTAINING FINELY DIVIDED ADDITIVES

[75] Inventors: Dieter Zickler, Offenbach/Main; Ulrich Thiele, Bruchkoebel, both of Fed. Rep. of Germany

[73] Assignee: Zimmer Aktiengesellschaft, Frankfurt, Fed. Rep. of Germany

[21] Appl. No.: 58,874

[22] Filed: May 6, 1993

[30] Foreign Application Priority Data

Nov. 21, 1992 [DE]  Fed. Rep. of Germany ....... 4239260

[51] Int. Cl.$^5$ ............... C08G 63/16; C08G 63/18; C08G 63/88; B29C 47/60
[52] U.S. Cl. ................................ 523/318; 523/351; 524/604; 528/308.2; 264/211.23; 264/211.24; 521/48.5
[58] Field of Search ............... 523/318, 351; 524/604; 264/211.23, 211.24; 528/308.2; 521/48.5

[56] References Cited

U.S. PATENT DOCUMENTS

| | | | |
|---|---|---|---|
| 3,703,488 | 11/1972 | Morton | 528/308.30 |
| 4,778,835 | 10/1988 | Sittel et al. | 264/9 |
| 5,094,797 | 3/1992 | Heel et al. | 264/211.23 |

Primary Examiner—Paul R. Michl
Assistant Examiner—Andrew E. C. Merriam
Attorney, Agent, or Firm—Allegretti & Witcoff, Ltd.

[57] ABSTRACT

Process for the manufacture of a polyester masterbatch containing finely divided solid additives in homogenous and agglomerate-free distribution, through the mixing, within a homogenizing extruder, of the powdery additive into the polyester, whereby, separately from the addition of the additive, small quantities of a diol are additionally fed into the extruder.

9 Claims, No Drawings

PROCESS FOR THE PREPARATION OF POLYESTER-MASTERBATCH CONTAINING FINELY DIVIDED ADDITIVES

BACKGROUND OF THE INVENTION

The invention relates to a process for the manufacture of polyester masterbatch containing finely divided solid additives in a homogenous and agglomerate-free distribution, through the mixing of powdery additive and polyester in a homogenizing extruder.

PRIOR ART

For many applications, finely divided solid additives must be added in the most homogenous and agglomerate-free manner possible, such as, for example, for delustering of fibers, for improvement of slipping and finding characteristics of foils, or for coloring of plastics. The addition of such types of additives to the polymer pellets or to the polymer melt, and the homogenization of the mixture in an extruder or in a special screw kneader, is already known (Kunststoffe [/=Plastics/], 73/6 [1983], pages 282–286). The distribution of the additives within the polymer, however, left a great deal to be desired.

In the manufacture of polyesters, therefore, the additive is first of all dispersed homogeneously in ethylene glycol, for example, and this suspension is then added to the polyester synthesis at the beginning of the esterification or at any later point in time before the conclusion of the polycondensation. The earlier that the additive suspension is added to the process, and the more completely the individual particles are dispersed in the ethylene glycol or in the reaction product, the better is the distribution of the additive in the polyester. Upon being added at the beginning of the synthesis, the attainable homogeneity satisfies demanding specifications. By means of the subsequent, partial depolymerization of the thus produced additive-containing polyester in the presence of ethylene glycol or of water vapor, for special applications such as low-pilling fibers, additive-containing polyesters with low molecular weight can be produced while still maintaining the distribution of the additives previously achieved (see: British patent number GB 1,049,414). It is disadvantageous here that the entire polyester synthesis plant, or at least a large part of the plant, is contaminated with additives which, upon the switching of production to another additive or to an additive-free product, leads to large quantities of transition materials. Particularly in the case of continuous polymer plants of high capacity, this manner of proceeding is only economically sustainable if the same additive is to be incorporated over a longer period of time.

In order to remedy this deficient flexibility, it is proposed, in the German patent disclosure number DE 1,924,691, to divert a polyester partial stream after the conclusion of the polycondensation, and to mix this partial stream, in an additional mixing reactor with an additive-ethylene glycol suspension, with simultaneous glycolysis up to a degree of polycondensation of approximately 1 to 20. The glycolyzate containing the additive is then either brought back into the polyester synthesis and subjected together with the primary stream to polycondensation and, if necessary, to precondensation, or else it is again polycondensed in an additional polycondensation reactor, and subsequently dosed into the polyester primary stream. The first variant should yield a good distribution of additive, but significant parts of the synthesis plant are, however, contamined with additives which, upon switching of the production, leads to large quantities of transition materials. Furthermore, through the returning of the partial stream, the residence time range of the polyester increases which has a negative effect on the polymer quality. The second variant requires an additional polycondensation reactor with only a moderate distribution of additive after being mixed with the primary stream.

The carrying out of the glycolysis of polyester scraps in an extruder is likewise known, but without, however, the simultaneous incorporation of additives (see: U.S. Pat. No. 3,703,488; East German patent number DD 116,251).

OBJECT OF THE INVENTION

The object of the present invention is thus to provide a process which, with the lowest equipment expenditure possible, permits the manufacture of polyester masterbatch containing finely divided, solid additives in homogeneous and agglomerate-free distribution, whereby the quality of the additive distribution should be comparable with that which can be attained upon the addition of an additive suspension at the beginning of the polyester synthesis. Furthermore, the switching of the production to another additive, or to an additive-free polyester, should be possible without producing a significant quantity of transition materials. The additive should have, furthermore, a significantly shortened residence time in the reaction mass, relative to the conventional process, and undesirable side reactions should be significantly suppressed.

DESCRIPTION OF THE INVENTION

The starting products for the manufacture of the masterbatch are thermoplastic polyesters with an intrinsic viscosity of at least 0.5 dl/g, particularly alkylene terephthalate- or alkylene naphthalate-homopolymers and -copolymers, such as polyethylene terephthalate, polybutylene terephthalate, polycyclohexane dimethylene terephthalate, polyethylene naphthalate and the copolymers thereof with other $C_{2-10}$-alkandiols and/or with poly(oxyalkylene)glycols and derived therefrom with up to 10 oxyalkylene units in the molecule and/or with other dicarboxyl acids, such as isopthalic acid, terephthalic acid, naphthalene dicarboxylic acid, biphenyldicarboxylic acid, adipic acid.

All finely-divided, solid polyester additives, such as titanium dioxide, inorganic or organic coloring powders, carbon black, anti-blocking agents, such as $SiO_2$, inorganic filling agents, such as kaolin, silicates or glass powder, are suited as additives.

The incorporation of the additives into the polyester is carried out in a single-screw or multiple-screw homogenizing extruder having a feed end and a discharge end, kneading zones, at least two feed-in points, and at least one degassing opening. Twin-screw extruders are preferred. Special screw kneaders can be used. Such types of extruders and their manner of operation are familiar to experts, including the introducing of polyester melts or pellets into one or into several partial streams, as well as of powdery additives, either together with the polyester or separately therefrom. It has surprisingly been found that the homogenous and agglomerate-free incorporation, within the extruder, of the powdery additives into the polyester can be significantly improved if, separately from the addition of the additives, small quantities of a diol are additionally fed into the extruder. It is essential for a good result that the additive is not fed in as a suspension but, as a powder which comes first into contact with the polyester and that separately from this, the diol first comes into contact with the additive-free polyester. Furthermore, no other substances which are capable of reaction with the polyester, the diol and/or the additive, should be present.

Alkanediols and cycloalkanediols with 2 to 10 C-atoms in the molecule, as well as the poly(oxyalkylene)-glycols derived therefrom, with up to 10 oxyalkylene units in the molecule, are suitable for use as the diol. The diol which is to be fed in is preferably identical with the diol which forms the polyester, thus, ethylene glycol with polyethylene terephthalate, 1,4-butanediol with polybutylene terephthalate, etc. It is also possible, however, to use diols which are different from the polyester-forming diol. Diols such as 1,4-cyclohexane dimethanol, which are solid at room temperature, can be introduced into the extruder in the form of solid particles or of a melt.

The quantity of diol which is fed in is selected so that, under the given kneading and temperature conditions, the intrinsic viscosity of the polyester, upon its discharge from the extruder, is reduced, relative to the intrinsic viscosity upon the entrance into the extruder, by 1 to 70% and, preferably, by 10 to 50%. For this, 0.01 to 5.0 mol, preferably 0.1 to 0.5 mol of diol per mol of the polymer polyester, are fed into the extruder. The average molecular weight (M) of the polyester which is necessary for the conversion into the weight ratio is computed from its intrinsic viscosity (IV), in accordance with the generally-known Kuhn-Mark-Houwink Equation:

$$IV = k.M^a,$$

in which "k" and "a" are empirically-determined constants. For intrinsic viscosities which are determined, at 25° C., on a solution of 0.5 g of polyester in 100 ml of a mixture of phenol and 1,2-dichloro-benzene (3:2 weight parts), the following is applicable:

For polyethylene terephthalate and, in an approximate way, for its low-modified copolymers: $k = 9.091.10^{-4}$ and: $a = 0.6585$.

For polybutylene terephthalate and, in an approximate way, for its low-modified copolymers: $k = 4.986.10^{-4}$ and: $a = 0.7534$.

The upper and the lower boundary of the diol quantity is not particularly critical, so that the molecular weight of the polyester can be estimated, if necessary, whereby, relative to the range of viscosity which is common to the polyester under discussion, an average molecular weight of approximately 15,000 corresponds to a lower intrinsic viscosity, one of 20,000 corresponds to a medium viscosity, and one of 30,000 to 35,000 corresponds to a viscosity in the upper range.

The additive-containing polyester masterbatch which is exiting from the extruder is mixed, without additional polycondensation, as a melt or, after the conversion into granulate, into additive-free polyester, and this mixture is processed into formed articles, such as films, fibers and containers. The additive concentration in the masterbatch is selected in such a manner that the intrinsic viscosity of the mixture which is to be processed into formed articles and with a predetermined concentration of additives in this mixture, is reduced through the addition of the masterbatch, relative to the intrinsic viscosity of the additive-free polyester, by not more than 0.05 dl/g, and preferably not more than 0.01 dl/g. Depending on the purpose of use, the concentration of additives in the masterbatch amounts to 2 to 70 weight %, preferably 5 to 40 weight % and, with carbon black, to a maximum of approximately 30 weight %.

Depending on the local conditions, the polyester is introduced into the extruder as a melt, or as pellets which are melted in the extruder through mechanical and thermal energy. The addition of the additives and the separate feeding in of the diols is carried out in the extruder section adjacent the polyester feed point and downstream of the polyester feed. The extruder section which comes next serves for the homogeneous dispersion of the additive, particularly through the introduction of mechanical energy. A partial depolymerization of the polyester molecules is carried out at the same time.

Particularly good results are attained if the addition of the powdery additive, relative to the total residence time of the polyester in the extruder (equal to 100%), is carried out in the downstream direction, 15 to 40%, preferably 20 to 30%, after the entrance of the polyester into the extruder, and the feeding in of the diol into the downstream direction is carried out before the addition of the additive, preferably immediately adjacent to the entrance of the polyester. As well, the diol which is to be fed in can, before its entrance into the extruder, be pre-mixed with the polyester pellets, or it can be dosed into the extruder simultaneously with the pellets. Particularly at lower additive concentrations in the masterbatch, the additive-free polyester can be divided into two partial streams. In this case, only 30 to 60% of the total quantity of the polyester are introduced into the extruder at said feed end. The remaining quantity is introduced in the downstream direction after the feeding in of the diol and the addition of the additive at a point situated, relative to the total residence time of the polyester in the extruder from the feed end (first polyester entrance point) to the discharge end, 45 to 60% after this first polyester entrance point.

SPECIFIC EXAMPLES

The polyester characteristics stated in the following examples were determined in the following manner:

The intrinsic viscosity (I.V.) was determined on a solution of 0.5 g polymer in 100 ml of a mixture of phenol and 1,2-dichlorobenzene (3:2 weight portions) at 25° C.

For the determination of the filter value, the masterbatch, with an additive concentration of not more than 5 weight % (if higher, to be adjusted to 5 weight % by mixing with additive-free polyester) is melted at 290° C. in a laboratory extruder (D = 20–30 mm, 20–25 D) and is then, by means of a spinning pump passed at a flow rate of 2.4 kg/h, through a filter apparatus with a 15 μm mesh filter with support fabric, and a surface area of 2.5 cm² until the pressure increase immediately in front of the filter amounts to 100 bar. The filter value is the quotient of the pressure increase multiplied by the filter surface area, divided by the flow rate. The lower and the upper values of at least 3 measurements are stated.

For the determination of additive agglomerates, a pellet (15 to 50 mg) is melted between slides at 280° C.; then it is pressed, by means of a load of 1 kp for 30 seconds into a film of 0.08 to 0.1 mm, and thereafter chilled. The agglomerates which are larger than 5 μm are counted under the microscope with polarized trans-illumination (if necessary, in addition, illumination at a 45° angle) per square of 3 mm edge length, and the average value from 10 measurements is calculated.

For the determination of the surface roughness, the masterbatch is homogeneously mixed with the additive-free polyester contained in the masterbatch, and this mixture is then processed into films. A conventional film extrusion equipment with an extruder, a straight slot die (120 cm), and a casting drum (D=150 cm) with electrostatic pinning wire electrode and film draw-off device, was used. With a melt temperature of approximately 270° C., a wire electrode voltage of 10 kV, and a draw-off speed of 25 m/min, films of 200 μm thickness, which were subsequently biaxially stretched to a thickness of 25 μm, were produced. The arithmetical average roughness value, "$R_a$", of these molded films was measured, in accordance with DIN 4768, using a Perthen "S8P" roughness testing device.

EXAMPLES 1 TO 8

A corotating twin-screw laboratory extruder with a screw diameter of 30 mm and a length of 35 D, was used for production of the polyester masterbatch containing finely-divided additives. The addition of the polyester pellets, as well as of the solid additives, was carried out by means of gravimetric dosings, and those of the diol by means of a piston pump. The extruder barrel was subdivided into three feed zones and one vacuum degassing zone. The subsequent pelletizer section consisted of a strand-extrusion die, a cooling trough and a strand-cutter (cylindrical pellets). The operating data of the laboratory extruder were as follows:

| Barrel temperatures: (from feed end to discharge end) | 275; 260; 250; 260; 250; 250; 250; 250° C.; Die: 250 to 260° C. |
|---|---|
| Melt temperature: | 265 to 270° C. |
| Screw rotation speed: | 250 RPM. |
| Throughput: | 20 to 25 kg/h. |

In the operating extruder, a partial quantity of 50% of the polyethylene terephthalate pellets, as well as the ethylene glycol, was dosed into the first feed zone. Then the pellets were melted, and thereafter the additives were introduced into the following feed zone. After intensive dispersion, the residual quantity of the polyethylene terephthalate pellets was added in the third feed zone. An additional mixing and dispersing then followed. Before the strand-extrusion die, the melt was degassed in the vacuum zone. After that, the polyester masterbatch melt was, in a strand form, solidified in a cooling bath, and was then subsequently pelletized.

The polyethylene terephthalate used had an intrinsic viscosity of 0.65 dl/g. The following additives were used: titanium dioxide, fiber quality, anatase type, particle size 0.2 to 0.3 μm, and kaolin, film quality, particle size 0.1 to 0.2 μm.

Examples 2, 3, 5, 7 and 8 are examples in accordance with the invention. Examples 1, 4 and 6 were carried out in the same manner but, however, for the purpose of comparison, without the feeding in of diol in accordance with the invention. The test results are set forth in Table 1.

EXAMPLES 10, 11, 13 AND 14

A portion of the polyester masterbatch pellets (produced in accordance with Examples 1, 2, 6 and 7) was subsequently charged into an extruder for further processing. Polyethylene terephthalate, which was identical with the polyethylene terephthalate used for the production of the masterbatch was added, and the mixtures were processed, in the usual manner, into fibers and films. The data are given in Table 2.

COMPARATIVE EXAMPLES 9 AND 12

For the purpose of comparison, polyesters containing additives were produced through the addition of an additive suspension during the polyester synthesis. A 10% additive/ethylene glycol suspension was produced, in the conventional manner, by means of wet grinding in a pearl mill and dispersion with a toothed disk agitator, with a subsequent super-fine filtration with triple passage, and this suspension was added to the polyester synthesis at the beginning of the precondensation stage. The results are given, as well, in Table 2.

EXAMPLES 15 TO 20:

The production of the masterbatch containing the finely divided additives was carried out in the same manner as described in Examples 1 to 8 but, however, instead of polyethylene terephthalate, there was used, in Examples 15 to 18, polybutylene terephthalate (PBT), with an intrinsic viscosity of 0.90 dl/g and, in Examples 19 and 20, there was used an ethylene terephthalate copolyester (CoPET), modified with 15 weight % isophthalic acid, and with an intrinsic viscosity of 0.69 dl/g and a melt temperature of $T_m = 225°$ C. Also, no ethylene glycol was used, but, in all cases, 1,4-cyclohexane dimethanol (CHDM) was dosed into the polyester in the extruder. The data are given in Table 3.

TABLES

The quantities used and the quality characteristics are summarized in the following tables, both for the examples in accordance with the invention, as well as for the comparative examples. The values of the polyethylene terephthalate masterbatch are listed in Table 1, and those of the polyethylene terephthalate to which the polyethylene terephthalate masterbatch of Table 1 was added during the further processing to fibers or films, are listed in Table 2. Table 3 contains the characteristic values of the polyester masterbatches which were produced in accordance with Examples 15 to 20.

A comparison of these characteristic quality values shows that the additive distribution achieved in accordance with the process of the invention has the same quality as with the addition of an additive suspension at the beginning of the precondensation stage of the polyester synthesis, but without, however, the disadvantage of a contamination of the synthesis plant by the additives. The distribution of additives attained in accordance with the invention is significantly improved relative to the incorporation of the additives in the extruder, without the addition of diol.

TABLE 1

Polyethylene terephthalate masterbatch.

| Example Number | Type | Weight % | Ethylene Glycol mol/mol PETP | Intrinsic Viscosity dl/g | Filter Value (Additive Concentration of 5 weight %) bar · cm²/kg |
|---|---|---|---|---|---|
| 1 | TiO$_2$ | 30 | None | 0.56 | 50–62.5 |
| 2 | TiO$_2$ | 30 | 0.33 | 0.48 | 15–25 |
| 3 | TiO$_2$ | 30 | 0.50 | 0.45 | 12.5–25 |
| 4 | TiO$_2$ | 5 | None | 0.57 | 45–55 |
| 5 | TiO$_2$ | 5 | 0.25 | 0.53 | 20–25 |
| 6 | Kaolin | 20 | None | 0.54 | 40–60 |
| 7 | Kaolin | 20 | 0.25 | 0.49 | 25–35 |
| 8 | Kaolin | 22 | 0.25 | 0.47 | 20 |

TABLE 2

Masterbatch containing polyethylene terephthalate fibers and films.

| Example No. | Masterbatch of Example No. | Additive Concentration Weight % | Agglomerate Units 5–10 μm | Agglomerate Units 10–20 μm | Agglomerate Units >20 μm | Filter Value bar · cm²/kg | Average Roughness μm |
|---|---|---|---|---|---|---|---|
| 9 | TiO$_2$, Comparison | 0.35 | 0 | 0 | 0 | 6–12 | — |
| 10 | 1 | 0.36 | 1.46 | 1.04 | 0.5 | 8–15 | — |
| 11 | 2 | 0.36 | 0.5 | 0 | 0 | 4–12 | — |
| 12 | Kaolin, Comparison | 0.20 | 0.19 | 0.38 | 0 | 15–18 | 0.018 |
| 13 | 6 | 0.20 | 2.57 | 1.04 | 0.8 | 8–12 | 0.030 |
| 14 | 7 | 0.20 | 0.51 | 0 | 0 | 4–10 | 0.018 |

TABLE 3

Polybutylene terephthalate and ethylene terephthalate copolyester masterbatch.

| Example No. | Polyester | Additive Type | Additive Weight % | CHDM mol/mol Polyester | Intrinsic Viscosity dl/g | Filter Value (Additive Concentration of 5 weight %) bar · cm²/kg |
|---|---|---|---|---|---|---|
| - | PBT | TiO$_2$ | 30 | None | 0.72 | 65–80 |
| 16 | PBT | TiO$_2$ | 30 | 0.5 | 0.55 | 15–20 |
| 17 | PBT | Kaolin | 20 | None | 0.70 | 55–75 |
| 18 | PBT | Kaolin | 20 | 0.5 | 0.57 | 20–25 |
| 19 | Co-PET | Kaolin | 20 | None | 0.58 | 38–45 |
| 20 | Co-PET | Kaolin | 20 | 0.25 | 0.52 | 15–20 |

We claim:

1. In a process for making a polyester masterbatch containing 2–70 weight % of finely divided solid additives in homogeneous and agglomerate-free distribution comprising providing a homogenizing extruder having a feed end and a discharge end, introducing a polyester into said feed end, said polyester having a predetermined intrinsic viscosity of at least 0.5 dl/g which includes the steps of
   a) adding said additive in the downstream direction at a point along said extruder representing 15–40% of the residence time said polyester is in the extruder, the total residence time being equal to 100%,
   b) adding separately from said additive, and in the downstream direction before the point of said additive addition, approximately 0.01 to 5.0 mol of a diol per mol of polyester to reduce said predetermined intrinsic viscosity by 1 to 70%, measured at said discharge end, said steps being performed in the absence of substances capable of reaction with said polyester, said diol or said additive.

2. The process of claim 1 in which step b) is carried out immediately downstream of said feed end and in which in step a) said additive is added at a point representing 20–30% of the total residence time.

3. The process of claim 1 in which 30 to 60% of said polyester are introduced into said feed end, and the remaining 70 to 40% of said polyester are introduced downstream after step b) and step a).

4. The process of claim 3 in which said remaining 70 to 40% of said polyester are introduced, in the downstream direction, at a point along said extruder representing 45 to 60% of the residence time of the polyester in the extruder from the feed end to the discharge end, this total residence time being equal to 100%.

5. The process of claim 1 or 3 in which said polyester is introduced into said extruder as a granulate or as a melt.

6. The process of claim 1 or 3 in which the diol of step b) is identical to the diol from which the polyester was formed.

7. The process of claim 1 in which the quantity of diol in step b) is approximately 0.1 to 0.5 mol per mol of polyester.

8. The process of claim 1 in which the masterbatch produced, without further polycondensation, is mixed as a melt or a granulate with additive-free polyester.

9. The process of claim 8 in which the mixture of masterbatch and additive-free polyester is processed into formed articles.

* * * * *